United States Patent [19]

Lebedev et al.

[11] 4,376,882
[45] Mar. 15, 1983

[54] METHOD OF RESISTANCE FLASH BUTT WELDING

[76] Inventors: Vladimir K. Lebedev, ulitsa Engelsa, 25, kv. 12; Sergei I. Kuchuk-Yatsenko, ulitsa Filatova, 1, kv. 47; Boris I. Kazimov, ulitsa Kotovskogo, 11, kv. 20; Vasily F. Zagadarchuk, Kharkovskoe shosse, 2, kv. 232; Vasily A. Sakharnov, ulitsa Solomenskaya, 41, kv. 93; Vitaly T. Cherednichok, Zadorozhny pereulok, 6, kv. 41, all of, Kiev, U.S.S.R.

[21] Appl. No.: 175,685

[22] Filed: Aug. 5, 1980

[51] Int. Cl.³ .............................................. B23K 11/04
[52] U.S. Cl. .................................................... 219/100
[58] Field of Search ......................................... 219/100

[56] References Cited

U.S. PATENT DOCUMENTS 3,790,739  2/1974  Lifshits et al. .

FOREIGN PATENT DOCUMENTS 1006547  4/1957  Fed. Rep. of Germany .

182265  5/1966  U.S.S.R. .

OTHER PUBLICATIONS

Welding Handbook Sixth Edition, Section Two AWS, New York 1969, Section 27.3.
Kuchuk-Yatsenko et al; "Method for Continuous Resistance Flash Butt Welding of Articles Having a Large Cross Section"; Kiev, 1968; pp. 4 to 10.
Kuchuk-Yatsenko et al; Continuous Resistance Flash Butt Welding; Kiev, 1976; pp. 134-135.

Primary Examiner—Elliot A. Goldberg
Attorney, Agent, or Firm—Fleit, Jacobson & Cohn

[57] ABSTRACT

Surfaces of metal workpieces being welded are fused at a constant speed of feeding the workpieces towards each other, and the speed of feeding is, before the upsetting, increased to a final value thereof for a period of (1.0 to 4.0) ($\Delta max/v_1$), where $\Delta_{max}$ is the maximum gap between the workpiece surfaces being welded and $v_1$ is the average speed of feeding the workpieces over the period of its increase. Empirical formulas are given to determine the maximum gap for workpieces of various thicknesses.

2 Claims, 8 Drawing Figures

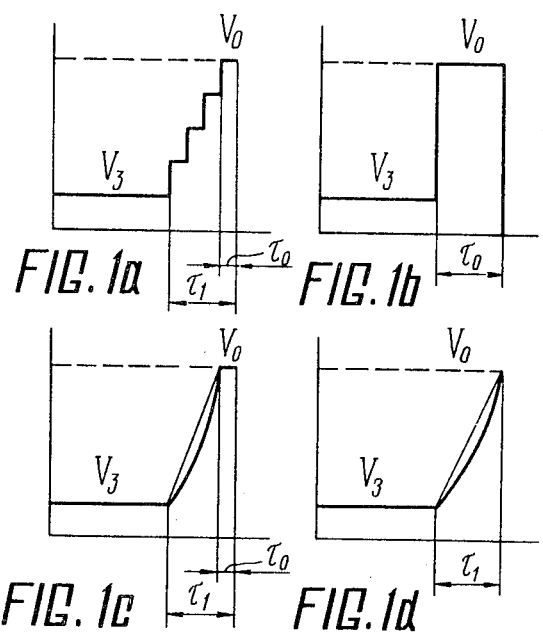

METHOD OF RESISTANCE FLASH BUTT WELDING

BACKGROUND OF THE INVENTION

1. Field of the Invention

The present invention relates to resistance butt welding, and more particularly to a method of resistance flash butt welding of metals.

The invention is particularly useful for welding workpieces with relatively large welding surfaces, such as for welding workpieces with relatively large welding surfaces, and such as for welding structures from rolled ferrous metal, tubing, sheet metal at a relatively low set specific power of welding transformers.

2. Description of the Prior Art

Various resistance flash butt welding methods have been proposed wherein the speed of feeding the workpieces being welded toward each other is in the course of welding increased as a function of the current pulsation frequency (USSR Inventor's Certificate No. 182,265), or of the current pulse rate (Japan Pat. No. 46-8566/71), or of the voltage drop across the contact, i.e. across the welding zone or the spark gap (U.S. Pat. No. 3,790,739), or of the current density (FRG Pat. No. 1,006,547). These methods are suitable for welding workpieces with a small welding section, when the welding can be accomplished at a relatively high set specific power of welding machines.

None of the above methods has, however, found practical application for welding thick-walled workpieces with large welding sections. An adequate quality of joints is in this case attained by the welding method described in the works by Kuchuk-Yatsenko S. I. and Lebedev V. K. "Kontaktnaya svarka nepreryvnym oplavleniem izdeliy s bolshim poperechnym secheniem" (Continuous Resistance Flash Butt Welding of Large Cross-section Workpieces), Kiev, "UkrNIINTI", 1968, and "Kontaktnaya stykovaya svarka nepreryvnym oplavleniem" (Continuous Resistance Flash Butt Welding), Kiev, "Naukova dumka", 1976, p. 134. The method essentially consists in that the workpieces being welded are first fused at an initial constant speed of feeding the workpieces towards each other, and before the upsetting the feeding speed is stepwise or continuously increased from the initial value $v_3$ to the final value $v_o$.

If the fusion stability gets upset, the initial constant speed $v_3$ can be appropriately adjusted in the course of welding.

During the period of fusion at the initial constant feeding speed which ordinarily is of 0.1 to 0.3 mm/s, the fusion is of a low intensity and proceeds with long current interruptions, with the result that a large amount of oxides originates on the surfaces being fused. The metal oxidation is particularly intense at the areas of deep craters, where the gap between the workpieces being welded is the maximum. It is at these areas that the thickest layers of oxides, most difficult to remove in the upsetting are formed.

As the feeding speed increases, so does the fusion intensity. Metal oxidation by the air oxygen in the welding zone (in the spark gap) diminishes. Therefore, increasing the feeding speed to the optimum value before the upsetting, in accordance with the method under consideration, allows the weld joint quality to be significantly upgraded.

The method enables an adequate quality of joints to be attained with either a stepwise (FIG. 1, a and b) or a continuous (FIG. 1, c and d) increase of the feeding speed. Both extensive theoretical studies and a vast body of practical evidence have shown that the conditions for producing high-quality joints are the most favourable when the increase of the feeding speed is governed by a wired-in program.

The above-described method, however, suffers from a disadvantage consisting in that the duration $\tau_1$ of the period of the increased feeding speed $v_2$ (FIG. 1) is set as a function of energy characteristics (e.g. current, power) of the fusion process, while no account is taken of the size of the maximum gap where oxide formation during the period of fusion at a constant initial speed is most probable. As a result, the desired effect, i.e. creation of the conditions for producing high-quality joints, is not in all cases attained for the period of an increased feeding speed.

This is especially pronounced in welding workpieces with a large, extended cross-section, where the fusion is to a considerable extent localized along the perimeter of the workpieces. This, especially with small upsetting tolerances, gives rise to defects such as thin oxide films at some regions of the joint zone, which in testing the weld joints shows up as a drop in the average mechanical characteristics, first of all in the plasticity characteristics.

At the same time, ever more exacting requirements upon the service characteristics of weldments, such as of large (up to 1420 mm) diameter gas pipelines at North, place particularly stringent demands on the mechanical properties of welded joints.

SUMMARY OF THE INVENTION

The object of the present invention is to provide a method of resistance flash butt welding of metals, which produces weld joints with a higher, as against the prior art, quality and improved mechanical properties of the metal in the weld zone.

More specifically, the object of the invention is to provide a method of resistance flash butt welding of metal workpieces having relatively large welding sections, which ensures a high-quality joint.

The above-mentioned and other objects are attained by providing a method of resistance flash butt welding of metal workpieces of more than 5 mm in thickness, which consists in that the surfaces of the workpieces being welded are fused at a constant speed $v_3$ of feeding the workpieces towards each other, and the speed of feeding the workpieces is, before the upsetting, increased to the final value $v_o$ of the speed $v_o$ of feeding, wherein, according to the invention, the duration of the period of the accelerated feeding of the workpieces is $(1.0 \text{ to } 4.0)(\Delta max/v_1)$, where $\Delta_{max}$ is the maximum gap being formed between the workpiece surfaces being welded before the increase in their feeding speed and $v_1$ is the average workpiece feeding speed over the period of its increase.

In accordance with a modification of the invention, the duration of the period of feeding the workpieces being welded at their final feeding speed $v_o$ is $(0.1 \text{ to } 0.5)(\Delta max/v_1)$, but not more than 3 s.

BRIEF DESCRIPTION OF THE DRAWINGS

The exact nature of the invention will be more clear from the following detailed description thereof with reference to the accompanying drawings, in which:

FIGS. 1a, 1b, 1c and 1d show graphs of incease in the workpiece feeding speed for various programs of their feeding; and FIG. 2 is a diagrammatic illustration of the welding zone, which shows, in a simplified manner, the process of origination of craters, where

DETAILED DESCRIPTION OF THE PREFERRED EMBODIMENTS

To make possible removal from the surfaces being fused, of the thick oxides formed during the fusion at an initial speed, the duration $\tau_1$ of the period of fusion at increased speeds $v_2$ of feeding the workpieces being welded should equal or exceed the fusion time in which the metal of the surfaces, including that on the bottom of the deepest craters, is fully renovated. The time $\tau_2$ of the full renovation of the surfaces being fused is defined by the maximum gap $\Delta_{max}$ (FIG. 2) between the workpieces being welded before increasing their feeding speed and by the preselected average feeding speed $v_1$ for the speed increase period, and is expressed by the formula $$\tau_2 = \Delta max / v_1.$$

Determining the value of $\tau_2$ involves great difficulties stemming from the fact that no relations between the size of the maximum gap and the values of individual variables of the welding process have been established.

Figure 2A:
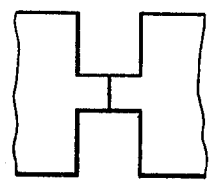
FIGS. 2a and 2b illustrate a destruction of a contact with a "large" height of projections on the surfaces being fused.
Figure 2B:
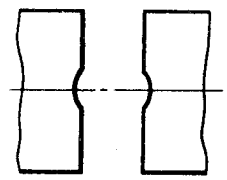
Figure 2C:
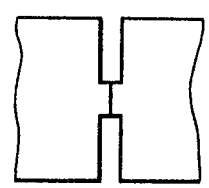
FIGS. 2c and 2d illustrate specific features of origination of craters on the surfaces being fused with a "small" gap therebetween.
Figure 2D:
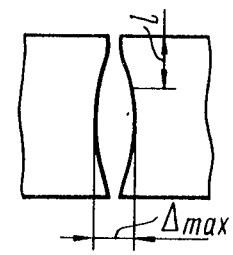

Studies have shown the value of $\Delta_{max}$ to depend on specific features of origination and destruction of contacts in the course of fusion. If the gap in the vicinity of a contact is large enough, which may occur with a large height of projections on the surfaces being fused, then no marked depressions are left on the fusion surfaces after the destruction of contacts (FIGS. 2a and 2b). If the gap is small (FIG. 2c), the metal of contacts is in the course of its melting forced by electrodynamic forces into the gap between the workpieces being welded to form a welding region characterized by a metallic bond between the workpieces, due to which the region is heated over its entire surface simultaneously. A crater being formed as the result of melting-out of this region will be the deeper, the greater is its area, which is in turn conditioned by the gradient of the temperature field ahead of the fusion front (FIG. 2d). The values of the gradients will differ if the heat removal conditions at the regions will be different. The heat removal rate at the edges of specimens is lower, and hence a crater is shallower, than at the centre of the fusion surface; because of this, the crater depth diminishes as the fusion front migrates from the centre to the edge of the fusion surface.

With specimens thick enough, the heat removal rate remains unchanged while the fusion front migrates for a certain distance 1 from the edge of the fusion surface (FIG. 2d). In this case, whatever the deposition of a contact, its heating corresponds to the pattern of heating a semi-infinite body by a point source.

It follows that when the thickness of the metal being welded exceeds 2 l, where l is the length of the portions of the end faces being fused, disposed at the surfaces of the workpieces being welded, over which portions the gap between the workpieces rises from the minimum to the maximum size (FIG. 2d), the maximum depth of craters and hence also the maximum size of the gap between the workpieces, depend but little on the thickness of the latter. Experiments have shown that l=9 to 10 mm; consequently, varying the thickness of a workpiece being welded having thickness more than 18 to 20 mm exerts little effects on the value of $\Delta_{max}$, which is in contrast to the case with thicknesses below 18 mm. It has been established by experiments that the maximum gap between the workpieces varies in direct proportion to their thickness, but the rate of variation of the value of $\Delta_{max}$ in welding workpieces less than 18 mm in thickness is much higher than that in welding workpieces whose thickness exceeds 20 mm.

The heating of the contacts is conditioned not only by the heat removal conditions, but also by their conductivity. The conductivity increases with increasing no-load voltage $U_o$, and high values of $U_o$ create therefore more favourable conditions for increasing the electric contact area. Besides, a larger amount of metal is melted out per unit time at high voltages.

Due to this, a large amount of molten metal which forms the secondary contact accumulates in the gap between the workpieces being welded, ahead of the fusion front of the initial contact with the result that the depth of craters, and, hence, also the maximum gap between the workpieces, increase. Studies have shown the maximum gap between the workpieces being welded to vary in direct proportion to the no-load voltage, such a relation remaining in welding workpieces of any thickness.

The size of the maximum gap is independent of other welding process variables. Thus, varying the fusion rate results only in changing the configuration of craters in the surfaces being fused; as the rate increases, the slope of their edges diminishes, while the depth remains unchanged.

Proceeding from the obtained evidence, empirical formulas were derived for determining the size of the maximum gap in fusion between the workpieces being welded for workpieces of carbon, low-alloy, and the great majority of high-alloy steels. For thicknesses from 5 to 20 mm:

$$\Delta_{max} = U_o (0.022\delta + 0.200);$$

for thicknesses over 20 mm:

$$\Delta_{max} = U_o (0.001\delta + 0.620),$$

where $\Delta_{max}$ and $\delta$ are respectively the maximum gap and the thickness of the workpieces being welded in mm, and $U_o$ is the no-load voltage in volts.

The above formulas for the maximum gap allow the value of $\tau_2$ to be accurately determined under various welding conditions.

As mentioned above, a full renovation of the surfaces being fused occurs at $\tau_1 \geq \tau_2$. However, with $\tau_1 > \tau_2$, thin oxide films may, like as with $\tau_1 < \tau_2$, develop in the weld joint zone, since in this case the air oxygen can as well penetrate into the welding zone.

To create the most favourable conditions for the formation of high-quality joints, it is desirable that during the speed increase period the maximum gap be maintained as small as possible.

If the speed is during this period increased stepwise (FIGS. 1a, and 1b), the maximum gap will diminish at the moment of transient processes proceeding in the welding zone, in the spark gap. In a current oscillogram (not shown), transient processes are characterized by a heavy current and no interruptions in its flow.

Transient processes are observed only at the moment of changeover from one, lower, to another, higher, speed.

The maximum transient time, such as in welding 20 mm thick workpieces at various degrees of increasing the feeding speed, may amount to 0.3 to 1.0 s. Setting the duration of each stem within this range provides for that the transient processes will proceed over the entire speed increase period.

Such a speed increase program features a high power consumption and is therefore inexpedient, particularly in welding thick-walled workpieces. To reduce the set power, the value of $\tau_1$ must be increased.

Considerably shortening the time of fusion at a constant high speed adversely affects the weld joint quality. The latter results from that, despite shortening the interruptions in fusion of the maximum gap regions, which promotes upgrading the joint quality, the maximum gap does not diminish, while fusion localizes as it does at low feeding speeds.

Investigating the process of fusion of elementary contacts and of actual workpieces (plates, tubing, sheets) demonstrated that fusion of workpieces less than 5 mm in thickness proceeds under conditions when the time of existence of individual contacts will be the minimum possible.

Hence, the current flow interruptions will be the longest and the localization of the fusion process will be observed mainly at the perimeter of the workpieces being fused.

Increasing the thickness of the workpieces to be welded extends the time of the existence of contacts; this stems from the fact that, regardless of the area of contacts, the workpieces start melting at separate regions, at the points of electrical contact. In welding workpieces of more than 5 mm in thickness, molten metal is displaced by electrodynamic forces into the gap between the workpieces and, when the gap is narrow enough, can develop a new contact. This being the case, there occurs shortening of current flow interruptions. In spite of this fact, the localization of fusion of separate portions of the welding sections is similar to that observed in welding workpieces of under 5 mm in thickness. It is this that in turn creates the conditions for origination of oxides in the weld joint zone, which is also promoted by a decrease in the heating zone, occuring in prolonged fusion at high feeding speeds.

As the speed increases continuously (FIGS. 1c and 1d), processes similar to those observed with a stepwise speed increase may occur in the welding zone. The intensity of the processes will be conditioned by the value of acceleration. When the latter is relatively high, close to the critical value, exceeding which results in a short-circuit of the welding circuit, transient processes assume a stable nature and, beginning from the region of fusion at a low speed, last till the upsetting. Such a speed increase program also involves a high power consumption.

When the acceleration is too small, i.e. when the period of increasing the feeding speed from the initial to the final value is very long, the intensity of transient processes is so low that they exert substantially no effect on the size of the maximum gap. Fusion characterized by an unchanged size of the maximum gap is established in this case in the welding zone, where conditions similar to those existing during a period of prolonged fusion at a high speed are created. As a result, the same defects as those originating in a prolonged fusion at a high constant feeding speed develop in the weld joint zone.

Comprehensive investigations including many experiments on welding various workpieces differing in both geometrical dimensions (thickness and weld section length) and chemical composition have led to establishing the permissible relations between the duration $\tau_2$ of a full renovation of the surfaces being fused and the duration $\tau_1$ of the feeding speed increase period, at which the conditions ensuring the formation of high-quality joints at high feeding speeds with $\tau_1 > \tau_2$ are retained.

Under all rational conditions of welding various workpieces of over 5 mm in thickness, the optimum duration $\tau_1$ of the speed increase period may be set within the range of 1.0 to 4.0 of the value of $\tau_2$. The optimum duration $\tau_o$ of the feeding speed final step (FIGS. 1b, 1c and 1d) may be set within the range of 0.1 to 0.5 of the value of $\tau_1$, but to not more than 3 s.

If the values of $\tau_1$ and $\tau_o$ in the course of welding depart in any direction from the above-specified range, the stability of the weld joint quality will be impaired.

This is characteristic of all joints, whatever the chemical composition of the steel being welded.

When determining the optimum values for $\tau_1$ and $\tau_o$ within the above-specified ranges, one should take into account the thickness of the workpieces to be welded.

In welding workpieces of over 20 mm in thickness, the maximum gap between the workpieces reaches the maximun value. The final feeding speed for such workpieces is set as low as possible, and the duration of the fusion period with an increase in the feeding speed is therefore set within the range of (1.0 to 1.2) $\tau_2$.

For example, in welding 30 mm thick, 200 mm wide plates of carbon-manganese steel with vanadium and nitrogen with a 170-kVA machine at a voltage, $U_o$ being 7.28 V and an average speed, $v_1$ being 0.7 mm/s, the value of $\tau_1$ was set at 8.0 s from the following $$\Delta_{max} = 7.2 \, (0.001 \times 30 + 0.620) = 4.68 \text{ mm};$$

$$\tau_2 = \frac{4.68}{0.7} = 6.68 \, s; \, \tau_1 = 1.2 \cdot \tau_2 = 1.2 \times 6.68 = 8.016 \, s;$$

this value was rounded off to the nearest lower multiple of 0.5, and it was taken $$\tau_1 = 8.0 \, s.$$

In welding workpieces of less than 20 mm in thickness, the maximum gap diminishes. The final feeding speed in joining such workpieces is increased. The value of $\tau_1$ may be therefore increased for the purpose of reducing the set power. In this case, the widest range of variation of the value of $\tau_1$ corresponds to thinner-walled workpieces welded at higher speeds. Thus, for workpieces with a thickness of:

| | |
|---|---|
| $\delta$ = 17 to 20 mm | $\tau_1$ = (1.0 to 1.3) $\tau_2$ |
| $\delta$ = 15 to 17 mm | $\tau_1$ = (1.0 to 1.5) $\tau_2$ |
| $\delta$ = 12 to 15 mm | $\tau_1$ = (1.0 to 1.8) $\tau_2$ |
| $\delta$ = 10 to 12 mm | $\tau_1$ = (1.0 to 2.2) $\tau_2$ |
| $\delta$ = 7 to 10 mm | $\tau_1$ = (1.0 to 2.8) $\tau_2$ |
| $\delta$ = 5 to 7 mm | $\tau_1$ = (1.0 to 4.0) $\tau_2$ |

For example, in welding 159-mm diameter, 20-mm wall thickness heat-resistant chromium-molybdenum-vanadium-steel pipes with a 170-kVA machine at a voltage, $U_o$ being 7.0 V and an average speed, $v_1$ being 0.85 mm/s, the value of $\tau_1$ was set at 6.5 s from the following:

$$\Delta_{max} = 7.0 \ (0.22 \times 20 + 0.200) = 4.48 \text{ mm};$$

$$\tau_2 = \frac{4.48}{0.85} = 5.27 \ s; \ \tau_1 = 1.3 \times 5.27 = 6.851 \ s;$$

on rounding off, it was taken $$\tau_1 = 6.5 \ s.$$

In welding a X60 steel gas pipes of 1420-mm in diameter and 17.0-mm in wall thickness with a resistance butt welding machine for welding pipes up to 1420 mm in diameter at a voltage, $U_o$ of 7.0 V and an average speed, $v_1$ of 0.8 mm/s, the value of $\tau_1$ was set at 7.5 s from the following:

$$\Delta_{max} = 7.0 \ (0.022 \times 17.0 + 0.200) = 4.018 \text{ mm};$$

$$\tau_2 = \frac{4.018}{0.8} = 5.02 \ s; \ \tau_1 = 1.5 \times 5.02 = 7.53 \ s;$$

on rounding off, it was taken $$\tau_1 = 7.5 \ s.$$

In welding drill pipes with a resistance butt welding machine, of which drill pipes one was of a high-carbon steel containing chromium, nickel, and molybdenum, and the other, of a high-carbon silico-manganese steel, the pipe diameter being 127 mm, and the wall thickness, 15 mm, at a voltage, $U_o$, being 6.8 V and an average speed, $v_1$, being 0.85 mm/s, the value of $\tau_1$ was set at 7.5 s from the following:

$$\Delta_{max} = 6.8 \ (0.022 \times 15 + 0.200) = 3.604 \text{ mm};$$

$$\tau_2 = \frac{3.604}{0.85} = 4.24 \ s; \ \tau_1 = 1.8 \times 4.24 = 7.632 \ s;$$

on rounding off, it was taken $$\tau_1 = 7.5 \ s.$$

In welding heat-resistant boiler tubes of 159-mm in diameter and 12-mm in wall thickness with a resistance butt welding machine at a voltage, $U_o$, being 6.0 V and an average speed, $v_1$, being 0.9 mm/s, the value of $\tau_1$ was set at 6.5 s from the following:

$$\Delta_{max} = 6.0 \ (0.022 \times 12 + 0.200) = 2.784 \text{ mm}$$

$$\tau_2 = \frac{2.784}{0.9} = 3.09 \ s; \ \tau_1 = 2.2 \times 3.09 = 6.793 \ s;$$

on rounding off, it was taken $\tau_1 = 6.5$ s.

In welding plates (10 mm thick, with 350 mm wide surfaces to be welded cut out of 820-mm in diameter gas pipes made from alloy silico-manganese steel at a voltage, $U_o$, being 6.6 V and an average speed, $v_1$, being 1.1 mm/s, the value of $\tau_1$ was set at 7 s from the following:

$$\Delta_{max} = 6.6 \ (0.022 \times 10 + 0.200) = 2.772 \text{ mm};$$

-continued $$\tau_2 = \frac{2.772}{1.1} = 2.52 \ s; \ \tau_1 = 2.8 \times 2.52 = 7.056 \ s;$$

on rounding off, it was taken $$\tau_1 = 7 \ s.$$

In welding 7 mm thick, 350 mm wide low-carbon structural steel plates with a resistance butt welding apparatus at a voltage, $U_o$, being 5.8 V and an average speed, $v_1$, being 1.4 mm/s, the value of $\tau_1$ was set at 5.5 s:

$$\Delta_{max} = 5.8 \ (0.022 \times 7 + 0.200) = 2.053 \text{ mm};$$

$$\tau_2 = \frac{2.053}{1.4} = 1.466 \ s; \ \tau_1 = 4 \times 1.466 = 5.864 \ s;$$

on rounding off, it was taken $$\tau_1 = 5.5 \ s.$$

30 mm thick plates of carbon-manganese steel with vanadium and nitrogen; 20-mm wall thickness heat-resistant chromium-molybdenum-vanadium steel pipes; X60 steel pipes of 1420-mm in diameter and 17-mm in wall thickness; and 12-mm wall thickness low-carbon steel boiler tubes were welded with stepwise increasing the speed of feeding the workpieces being welded before the upsetting (FIG. 1a). The fusion time at the final step of the feeding speed for the above-listed workpieces was respectively set as follows:

$$\delta = 30 \text{ mm}; \quad \tau_0 = 3.0 \ s;$$

$$\tau_0 = 6.68 \times 0.5 = 3.3 \ s; \text{ it was taken } \tau_0 = 3.0 \ s;$$

$$\delta = 20 \text{ mm}; \quad \tau_0 = 2.0 \ s;$$

$$\tau_0 = 5.27 \times 0.4 = 2.1 \ s; \text{ it was taken } \tau_0 = 2.0 \ s;$$

$$\delta = 17 \text{ mm}; \quad \tau_0 = 2.0 \ s;$$

$$\tau_0 = 5.02 \times 0.4 = 2.0 \ s; \text{ it was taken } \tau_0 = 2.0 \ s;$$

$$\delta = 12 \text{ mm}; \quad \tau_0 = 1.5 \ s;$$

$$\tau_0 = 3.09 \times 0.5 = 1.545 \ s; \text{ it was taken } \tau_0 = 1.5 \ s.$$

15-mm wall thickness drill pipes of high-strength and alloy silico-manganese steel plates cut out of a pipe of 820-mm in diameter and 10-mm in wall thickness were welded with continuously increasing the feeding speed from the initial to the final value and fused at a constant final speed before the upsetting (FIG. 1c). The fusion time at the final step of the feeding speed was as follows:

for the 15 mm thick workpieces, $\tau_o = 2$ s ($\tau_o = 4.24 \times 0.5 = 2.12$; it was taken $\tau_o = 2.0$ s);

for the 10 mm thick workpieces, $\tau_o = 1.2$ s ($\tau_o = 2.52 \times 0.5 = 1.26$ s; it was taken $\tau_o = 1.2$ s).

7 mm thick low-alloy structural steel plates were welded with continuously increasing the speed without the final step (FIG. 1d).

The proposed method allows producing high-quality weld joints featuring stable mechanical characteristics. This has been confirmed by comprehensive tests of the above-listed joints made by the proposed welding method. Thus, all the specimens subjected to a tensile test (more than 350 specimens in all) showed the strength and plastic properties at the level of those of the base metal.

Of all the specimens subjected to a bending test (600 specimens in all), as little as 1.5% (9 specimens) had a bending angle from 90° to 180°, while the rest, i.e. 98.5% (591 specimens) had a bending angle of 180°. Of all the specimens subjected to the tensile test, 2 specimens (7 mm-thick welded plates) were ruptured at the weld joint (the test results were at the level of the base metal).

The use of the proposed method allows upgrading the stability of mechanical properties of flash butt welds to a level needed for critical weldments, such as large diameter gas and oil pipelines constructed in northern regions and high-pressure steam pipings of thermal power stations.

What is claimed is:

1. In a method of resistance flash butt welding of metal workpieces of more than 5 mm in thickness, comprising the steps of feeding the metal workpieces together, applying a welding voltage to achieve flashing, said metal workpieces being heated to fusion, and upsetting said metal workpieces; the improvement wherein said feeding step comprises initially feeding the surfaces of the metal workpieces at a constant speed of feeding, and then, prior to upset, increasing the speed of feeding from said constant speed of feeding to a higher final value of speed of feeding for a period of time having a duration of ($\Delta max/v_1$), where $\Delta max$ is a maximum gap found between the surfaces of the metal workpieces before the increase in speed of feeding, and $v_1$ is the average speed of feeding the workpieces over the period of increased speed of feeding.

2. The method as defined in claim 1, wherein the duration of the period of feeding the metal workpieces at the final value of speed of feeding is 0.1 to 0.5 times $\Delta max/v_1$, but not more than 3 seconds.

* * * * *